United States Patent
Wang

(10) Patent No.: US 8,753,799 B2
(45) Date of Patent: Jun. 17, 2014

(54) METHOD FOR FABRICATING LCD

(75) Inventor: Jun Wang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 156 days.

(21) Appl. No.: 13/375,227

(22) PCT Filed: Oct. 26, 2011

(86) PCT No.: PCT/CN2011/080842
§ 371 (c)(1),
(2), (4) Date: Nov. 30, 2011

(87) PCT Pub. No.: WO2013/053136
PCT Pub. Date: Apr. 18, 2013

(65) Prior Publication Data
US 2013/0095430 A1    Apr. 18, 2013

(30) Foreign Application Priority Data
Oct. 14, 2011   (CN) .......................... 2011 1 0312750

(51) Int. Cl.
*G03F 7/00*    (2006.01)

(52) U.S. Cl.
USPC ............................. 430/320; 349/106; 349/124

(58) Field of Classification Search
USPC ........................ 430/5, 320; 349/106, 124, 125
See application file for complete search history.

(56) References Cited

U.S. PATENT DOCUMENTS

| | | | |
|---|---|---|---|
| 2009/0316096 A1* | 12/2009 | Callegari et al. | 349/125 |
| 2010/0059709 A1* | 3/2010 | Bachels et al. | 252/299.6 |
| 2011/0189597 A1* | 8/2011 | Hsieh et al. | 430/7 |

\* cited by examiner

Primary Examiner — Stewart Fraser

(57) ABSTRACT

The present invention relates to a method for fabricating an LCD. The method includes fabricating a MAV layer on a glass substrate. The step of fabricating the MAV layer on the glass substrate comprises the steps of: (A) coating MAV organic monomers on the glass substrate; (B) patterning the MAV organic monomers through a photomask; and (C) curing the patterned MAV organic monomers. In accordance with a photo-curing material of the MAV layer, the fabricating method of the present invention has simple processes with low technical requirements.

13 Claims, 6 Drawing Sheets

METHOD FOR FABRICATING LCD

FIELD OF THE INVENTION

The present invention relates to a liquid crystal display (LCD) technology, and especially to a method for fabricating an LCD by using a photocurable material of a Multi-domain Vertical Alignment (MAV) layer.

BACKGROUND OF THE INVENTION

In flat panel display devices, the LCD has features of small size, low power consumption, relatively low manufacturing cost and no radiation, and so on, and occupies a dominant position in the current flat panel display market. The MAV technology utilizes protrusions to make liquid-crystal molecules align in a certain angle at rest, unlike a conventional vertical alignment. When applying a voltage, the liquid-crystal molecules are twisted to horizontal for making a backlight pass faster, whereby display time can be greatly decreased on the basis of a shorter response time of the vertical alignment of the liquid crystal molecules, a viewing angle thereof is broader, and the viewing angle can be increased to 160 or more degrees. Thus, the MAV type LCD has the advantages of a good color performance, a strong pure black performance, wide viewing angle, and so on, so it is abundantly used in the flat panel display industry.

In conventional processes of fabricating a MVA layer of the MVA type LCD, the MVA layer usually is formed by the steps of coating, soft baking, exposure, development, hard baking, and so on. There are some problems of complex processes and high technical requirements.

Therefore, there is a significant need to provide a method for fabricating an LCD for solving the problems existing in the prior art.

SUMMARY OF THE INVENTION

An objective of the present invention is to provide a method for fabricating an LCD by using a photocurable material of a MAV layer for solving the complex processes and the high technical requirements.

To achieve the foregoing objective, the technical solution of this invention is implemented as follows.

The present invention relates to a method for fabricating an LCD. The method includes fabricating a multi-domain vertical alignment (MAV) layer on a glass substrate. The step of fabricating the MAV layer on the glass substrate comprises the steps of: (A) coating MAV organic monomers on the glass substrate; (B) patterning the MAV organic monomers through a photomask; and (C) curing the patterned MAV organic monomers. The MAV organic monomers has a viscosity of 5 to 500 mPa·s and a coating thickness of 800 to 1800 nanometers at the step (A). A distance between the photomask and a surface of the MAV organic monomers is 0.3-50 micrometers at the step (B). A light for performing the patterning at the step (B) has a wavelength between 100 to 780 nanometers with an exposure time between 30 to 540 seconds. After the step (B) and before the step (C), the method further comprises the steps of: (B1) filtering the MAV organic monomers which are not patterned on the glass substrate; and (B2) cleaning the glass substrate for removing the non-patterned MAV organic monomers remaining in the glass substrate; the step (C) specifically comprises photo-curing and/or heat treating the patterned MAV organic monomers. A wavelength of a light of the photo-curing is between 100 to 780 nanometers with an exposure duration between 30 to 540 seconds. A temperature of the heat treatment is between 50 to 250 degrees with a treatment duration between 30 to 540 seconds. The MAV organic monomers being non-solvent type photocurable organic monomers.

The present invention relates to a method for fabricating an LCD. The method includes fabricating a MAV layer on a glass substrate. The step of fabricating the MAV layer on the glass substrate comprises the steps of: (A) coating MAV organic monomers on the glass substrate; (B) patterning the MAV organic monomers through a photomask; and (C) curing the patterned MAV organic monomers.

In the method for fabricating an LCD of the present invention, the MAV organic monomers has a viscosity of 5 to 500 mPa·s and a coating thickness of 800 to 1800 nanometers at the step (A).

In the method for fabricating an LCD of the present invention, a distance between the photomask and a surface of the MAV organic monomers are 0.3-50 micrometers at the step (B).

In the method for fabricating an LCD of the present invention, a light for performing the patterning at the step (B) has a wavelength between 100 to 780 nanometers with an exposure time between 30 to 540 seconds.

In the method for fabricating an LCD of the present invention, After the step (B) and before the step (C), the method further comprises the steps of: (B1) filtering the MAV organic monomers which are not patterned on the glass substrate.

In the method for fabricating an LCD of the present invention, after the step (B1) and before the step (C), the method further comprises the step of: (B2) cleaning the glass substrate for removing the non-patterned MVA organic monomers remaining in the glass substrate.

In the method for fabricating an LCD of the present invention, the step (C) specifically comprises photo-curing and/or heat treating the patterned MVA organic monomers.

In the method for fabricating an LCD of the present invention, a wavelength of a light of the photo-curing is between 100 to 780 nanometers with an exposure duration between 30 to 540 seconds.

In the method for fabricating an LCD of the present invention, a temperature of the heat treatment is between 50 to 250 degrees with a treatment duration between 30 to 540 seconds.

In the method for fabricating an LCD of the present invention, the MAV organic monomers being non-solvent type photocurable organic monomers.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Figure 1:
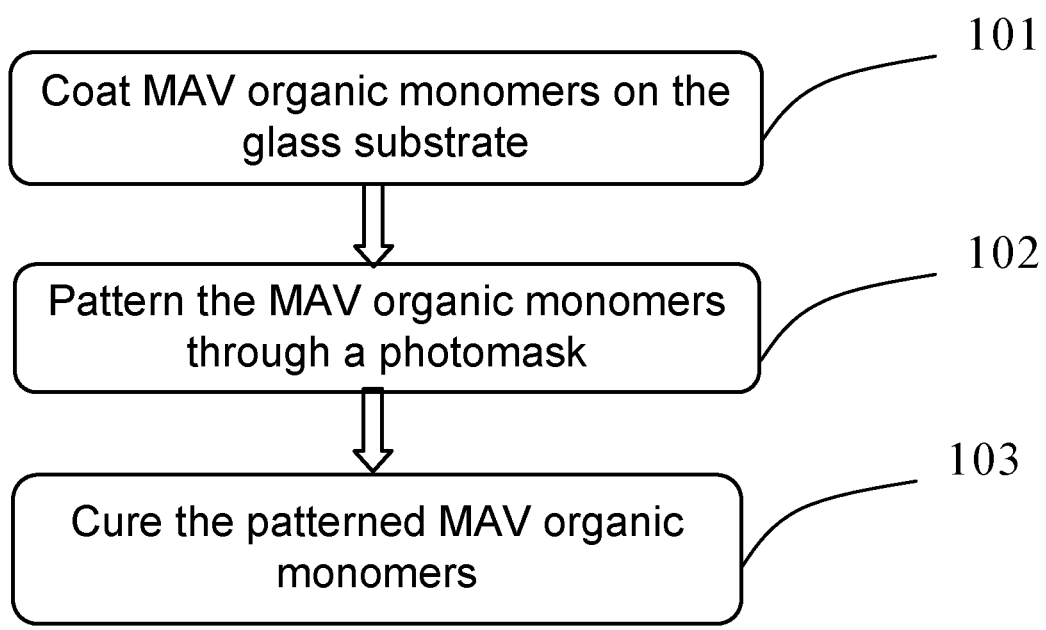
FIG. 1 is a flow chart illustrating a illustrating according to a first preferred embodiment of the present invention.

Descriptions of the following embodiments refer to attached drawings which are utilized to exemplify specific embodiments. In different drawings, the same reference numerals refer to like parts throughout the drawings.

The present invention relates to a method for fabricating an MAV type LCD. The method includes fabricating a MAV layer on a glass substrate 1 on which a color filter layer and a transparent electrode layer have been formed. Organic monomers for fabricating the MAV layer of the present invention are MVA organic monomers 2, so the MAV layer of the present invention can be cured directly through the exposure without the soft baking after coating. Therefore, the fabricating processes of the method for fabricating a MAV LCD are simple, environmentally friendly, low-skilled, and the production costs of the LCD can be effectively reduced. The MVA organic monomers 2 herein are MVA organic monomers which can be cured by exposing a light with corresponding wavelengths.

In FIG. 1 that is a flow chart illustrating a illustrating according to a first preferred embodiment of the present invention, the method for fabricating an LCD begins at step 101.

At step 101, the MAV organic monomers 2 are coated on the glass substrate 1.

At step 102, the MAV organic monomers 2 are patterned through a photomask 3.

At step 103, the MAV organic monomers 2 which have been patterned are cured.

Figure 4:
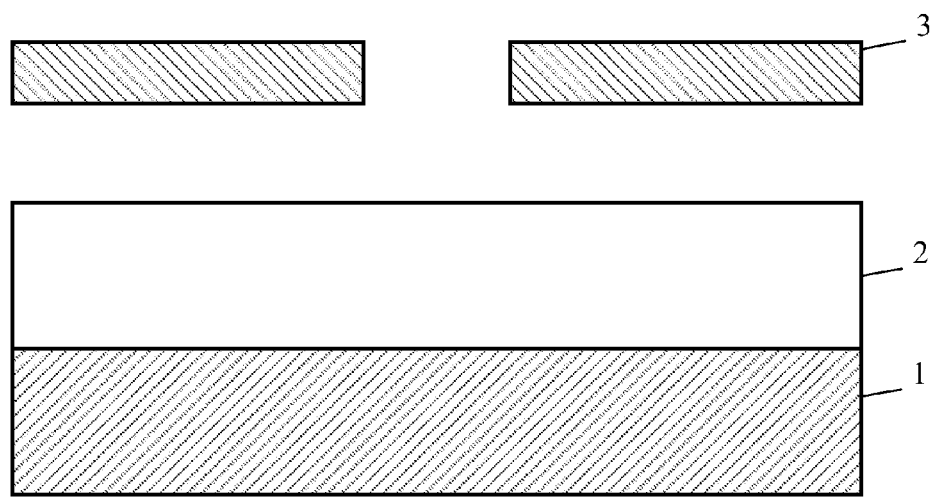
FIG. 4 is a first fabricating structural schematic drawing illustrating the method for fabricating an LCD according to the preferred embodiment of the present invention.
Figure 5:
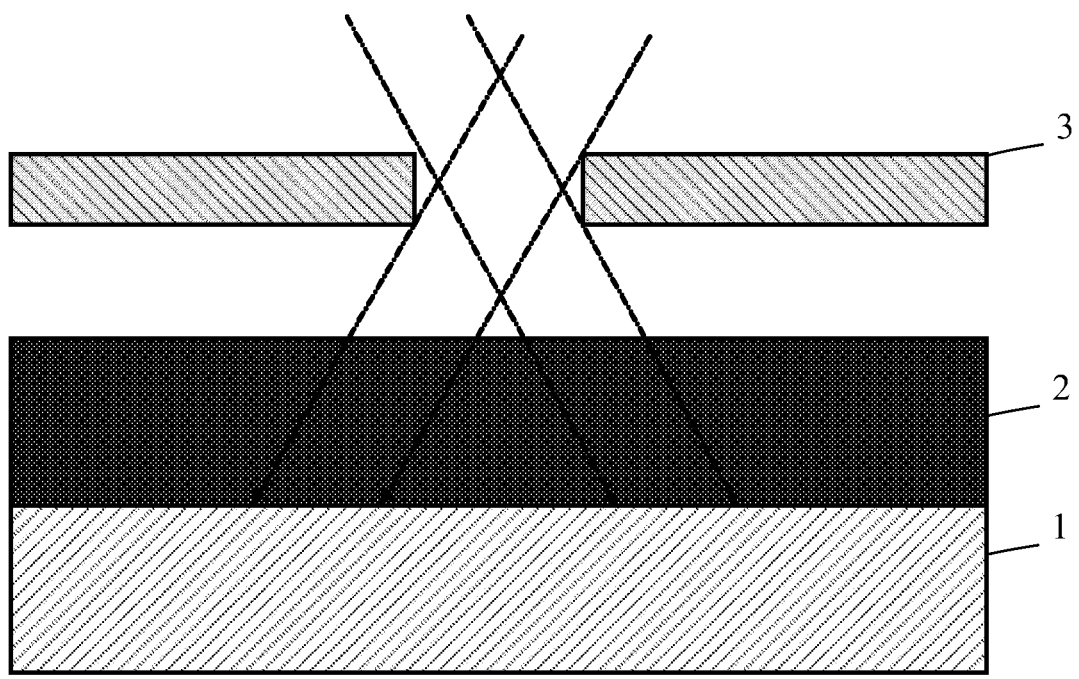
FIG. 5 is a second fabricating structural schematic drawing illustrating the method for fabricating an LCD according to the preferred embodiment of the present invention.
Figure 6:
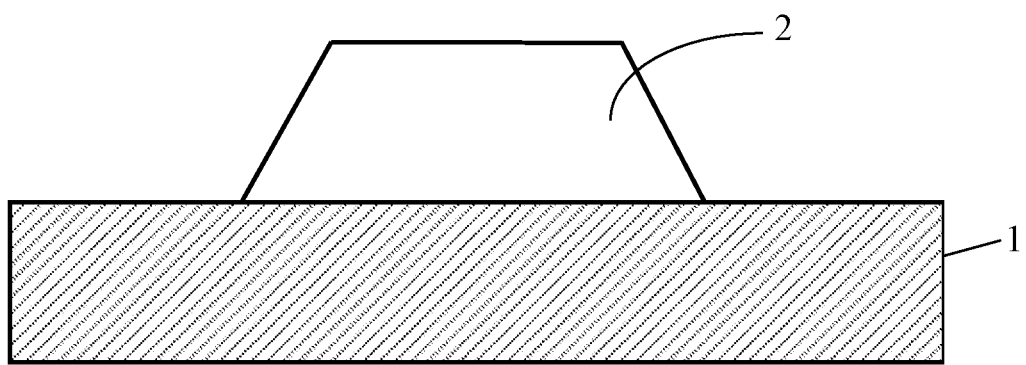
FIG. 6 is a third fabricating structural schematic drawing illustrating the method for fabricating an LCD according to the preferred embodiment of the present invention.

Specific implementing is depicted in FIG. 4 to FIG. 6. where FIG. 4 is a first fabricating structural schematic drawing illustrating the method for fabricating an LCD according to the preferred embodiment of the present invention; FIG. 5 is a second fabricating structural schematic drawing illustrating the method for fabricating an LCD according to the preferred embodiment of the present invention; and FIG. 6 is a third fabricating structural schematic drawing illustrating the method for fabricating an LCD according to the preferred embodiment of the present invention.

In FIG. 4, the MVA organic monomers 2 are coated on the glass substrate 1 on which the color filter layer and the transparent electrode layer have been formed. The MAV organic monomers has a viscosity of 5 to 500 mPa·s and a coating thickness of 800 to 1800 nanometers. Therefore, the MVA organic monomers have a better photo-curing treatment based on the assured thickness of the MVA layer. If the coating thickness is too thick, the MAV layer can not be completely cured finally. If the coating thickness is too thin, the MAV layer can not reach the objective for changing the direction of the liquid-crystal molecules.

Consequently, the photomask 3 with a desired pattern is disposed above the glass substrate 1 coated with the MVA organic monomer 2, and a distance between the photomask and a surface of the MAV organic monomers are 0.3-50 micrometers. As the distance between the photomask and the surface of the MAV organic monomers are closer, the accuracy of the patterning process is higher. Users can adjust the distance based on the desired accuracy requirement.

FIG. 5 illustrates the process that the MVA organic monomers 2 are patterned by using the photomask 3. A light with a wavelength between 100 to 780 nanometers is utilized to expose the MVA organic monomers 2 via the photomask 3 with an exposure duration between 30 to 540 seconds. The exposure duration can be set according to the various wavelengths and the coating thicknesses of the MVA organic monomers 2, thereby achieving a best curing effect of the MVA organic monomers.

The cured MVA layer is a trapezoid region located on the glass substrate 1 as shown in FIG. 6. Finally, the MAV organic monomers 2 which have been patterned are cured, and the way of the curing is by photo-curing and/or heat treating. When the photo curing is employed, a wavelength of a light of the photo-curing is between 100 to 780 nanometers with an exposure duration between 30 to 540 seconds. When the heat treatment is employed, a temperature of the heat treatment is between 50 to 250 degrees with a treatment duration between 30 to 540 seconds. The users can employ one or two of the above-mentioned curing ways to cure the patterned MVA organic monomers 2.

Figure 2:
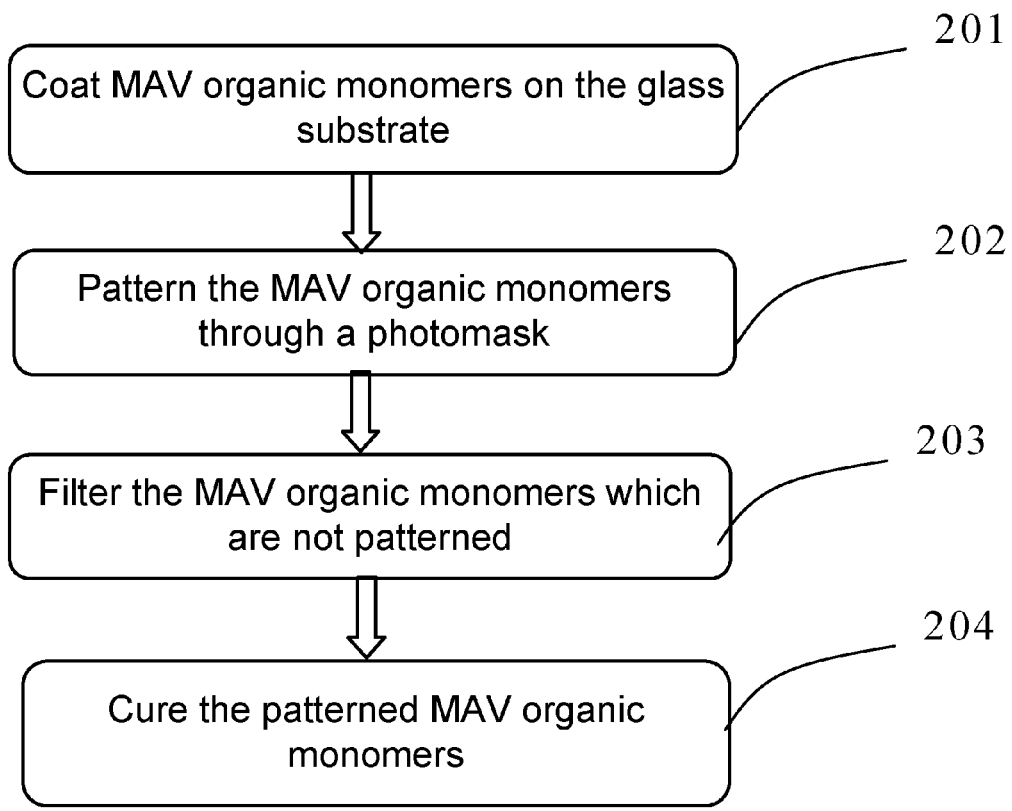
FIG. 2 is a flow chart illustrating a illustrating according to a second preferred embodiment of the present invention.

In FIG. 2 that is a flow chart illustrating a illustrating according to a second preferred embodiment of the present invention, the method for fabricating an LCD begins at step 201.

At step 201, the MAV organic monomers 2 are coated on the glass substrate 1.

At step 202, the MAV organic monomers 2 are patterned through a photomask 3.

At step 203, the MAV organic monomers 2 which are not patterned on the glass substrate 1 are filtered.

At step 204, the MAV organic monomers 2 which have been patterned are cured.

In the process of removing the photomask 3 in the method for fabricating an LCD, the filtered MAV organic monomers 2 which are not patterned on the glass substrate 1 can be collected for reusing at next time; thus, the manufacturing costs of LCD can be further reduced.

Figure 3:
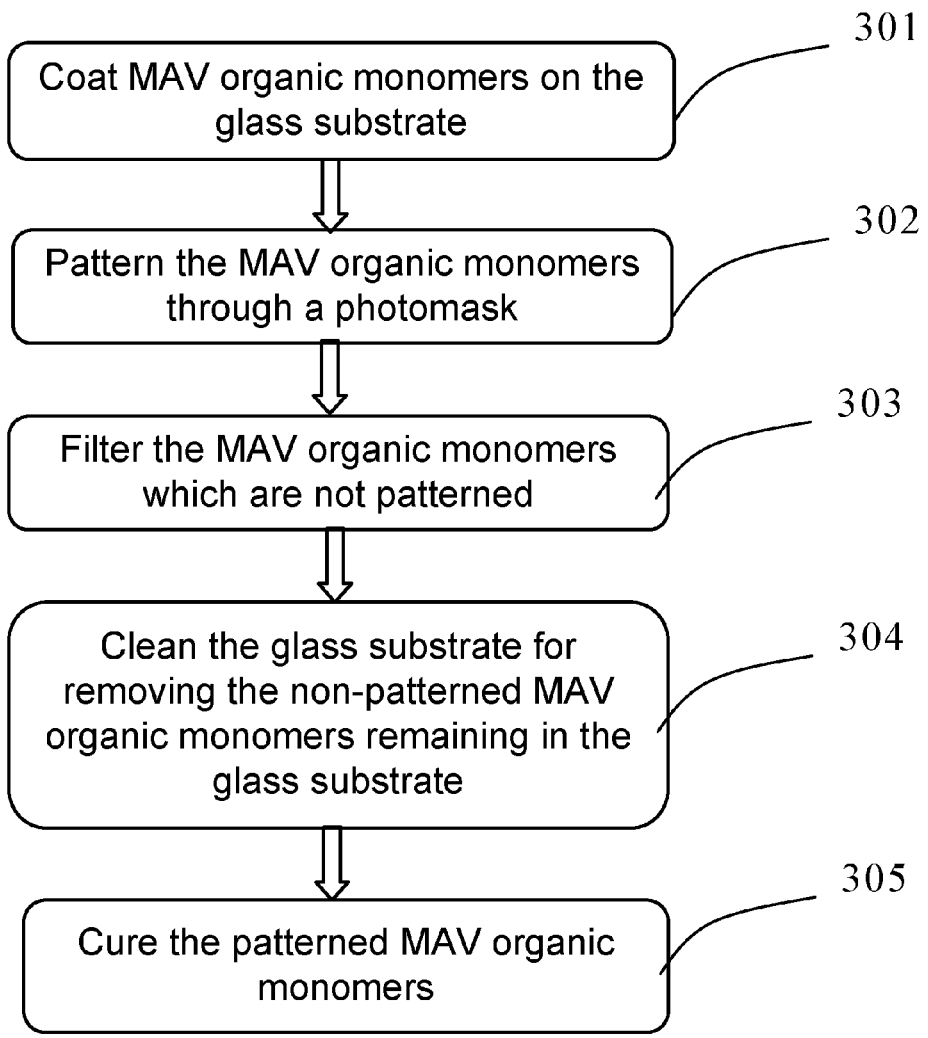
FIG. 3 is a flow chart illustrating a illustrating according to a third preferred embodiment of the present invention.

In FIG. 3 that is a flow chart illustrating a illustrating according to a third preferred embodiment of the present invention, the method for fabricating an LCD begins at step 301.

At step 301, the MAV organic monomers 2 are coated on the glass substrate 1.

At step 302, the MAV organic monomers 2 are patterned through a photomask 3.

At step 303, the MAV organic monomers 2 which are not patterned on the glass substrate 1 are filtered.

At step 304, the glass substrate 1 is cleaned for removing the non-patterned MVA organic monomers 2 remaining in the glass substrate 1.

At step 305, the MAV organic monomers 2 which have been patterned are cured.

After the MAV organic monomers 2 which are not patterned on the glass substrate 1 are filtered completely in the method for fabricating an LCD of the present invention, The glass substrate 1 is cleaned by using organic solvents for removing the non-patterned MVA organic monomers 2 remaining in the glass substrate 1. Thus, the effect of the MAV layer for the liquid-crystal molecules can be assured, and the vertical alignment of the liquid-crystal molecules does not be affected by the remaining MVA organic monomers 2.

In the method for fabricating an LCD according to the preferred embodiment of the present invention, the MAV organic monomers 2 are non-solvent type photocurable organic monomers. Because the MAV organic monomers 2 are non-solvent type photocurable organic monomers, it can be utilized without dissolving in a solvent, whereby there is no by-product of macromolecules formed during the photo-curing process. Therefore, the curing process is more complete, safe and easier in the curing operation without regarding to the treatment of the by-products.

In comparison with the conventional processes, the method for fabricating an LCD of the present invention has the advantages of simple processes, environmental protection, low technical difficulty, and so on, and the manufacturing cost of the LCD can be effectively reduced.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for fabricating an LCD, comprising fabricating a multi-domain vertical alignment (MAV) layer on a glass substrate, characterized in that, the step of fabricating the MAV layer on the glass substrate comprises the steps of:
   (A) coating MAV organic monomers on the glass substrate;
   (B) patterning the MAV organic monomers through a photomask for forming a trapezoid region on the glass substrate;
   (C) curing the trapezoid region of the patterned MAV organic monomers;
   the MAV organic monomers having a viscosity of 5 to 500 mPa·s and a coating thickness of 800 to 1800 nanometers at the step (A);
   a distance between the photomask and a surface of the MAV organic monomers being 0.3-50 micrometers at the step (B);
   a light for performing the patterning at the step (B) having a wavelength between 100 to 780 nanometers with an exposure time between 30 to 540 seconds;
   after the step (B) and before the step (C), the method further comprising the steps of:
   (B1) filtering the MAV organic monomers which are not patterned on the glass substrate; and
   (B2) cleaning the glass substrate for removing the non-patterned MAV organic monomers remaining on the glass substrate;
   the step (C) specifically comprising photo-curing and/or heat treating the patterned MAV organic monomers;
   a wavelength of a light of the photo-curing being between 100 to 780 nanometers with an exposure duration between 30 to 540 seconds;
   a temperature of the heat treatment being between 50 to 250 degrees with a treatment duration between 30 to 540 seconds;
   the MAV organic monomers being non-solvent type photocurable organic monomers.

2. A method for fabricating an LCD, comprising fabricating a multi-domain vertical alignment (MAV) layer on a glass substrate, characterized in that, the step of fabricating the MAV layer on the glass substrate comprises the steps of:
   (A) coating MAV organic monomers on the glass substrate, wherein the MAV organic monomers are non-solvent type photocurable organic monomers;
   (B) patterning the MAV organic monomers through a photomask for forming a trapezoid region on the glass substrate; and
   (B1) filtering the MAV organic monomers which are not patterned on the glass substrate; and
   (C) curing the trapezoid region of the patterned MAV organic monomers.

3. The method for fabricating an LCD according to claim 2, characterized in that the MAV organic monomers have a viscosity of 5 to 500 mPa·s and a coating thickness of 800 to 1800 nanometers at the step (A).

4. The method for fabricating an LCD according to claim 2, characterized in that a distance between the photomask and a surface of the MAV organic monomers are 0.3-50 micrometers at the step (B).

5. The method for fabricating an LCD according to claim 2, characterized in that a light for performing the patterning at the step (B) has a wavelength between 100 to 780 nanometers with an exposure time between 30 to 540 seconds.

6. The method for fabricating an LCD according to claim 2, characterized in that after the step (B1) and before the step (C), the method further comprises the step of:
   (B2) cleaning the glass substrate for removing the non-patterned MAV organic monomers remaining on the glass substrate.

7. The method for fabricating an LCD according to claim 3, characterized in that after the step (B) and before the step (C), the method further comprises the steps of:
   (B1) filtering the MAV organic monomers which are not patterned on the glass substrate; and
   (B2) cleaning the glass substrate for removing the non-patterned MAV organic monomers remaining on the glass substrate.

8. The method for fabricating an LCD according to claim 4, characterized in that after the step (B) and before the step (C), the method further comprises the steps of:
   (B1) filtering the MAV organic monomers which are not patterned on the glass substrate; and
   (B2) cleaning the glass substrate for removing the non-patterned MAV organic monomers remaining on the glass substrate.

9. The method for fabricating an LCD according to claim 5, characterized in that after the step (B) and before the step (C), the method further comprises the steps of:
   (B1) filtering the MAV organic monomers which are not patterned on the glass substrate; and
   (B2) cleaning the glass substrate for removing the non-patterned MAV organic monomers remaining in the glass substrate.

10. The method for fabricating an LCD according to claim 2, characterized in that the step (C) specifically comprises photo-curing and/or heat treating the patterned MAV organic monomers.

11. The method for fabricating an LCD according to claim 10, characterized in that a wavelength of a light of the photo-curing is between 100 to 780 nanometers with an exposure duration between 30 to 540 seconds.

12. The method for fabricating an LCD according to claim 10, characterized in that a temperature of the heat treatment is between 50 to 250 degrees with a treatment duration between 30 to 540 seconds.

13. The method for fabricating an LCD according to claim 11, characterized in that a temperature of the heat treatment is between 50 to 250 degrees with a treatment duration between 30 to 540 seconds.

* * * * *